United States Patent
Kawano et al.

(10) Patent No.: US 7,710,619 B2
(45) Date of Patent: May 4, 2010

(54) IMAGE PROCESSING APPARATUS AND METHOD THAT PERFORMS DIFFERENTIAL SCALING ON PICTURE REGIONS THAN ON TEXT AND LINE REGIONS TO ENHANCE SPEED WHILE PRESERVING QUALITY

(75) Inventors: Hiroyuki Kawano, Kanagawa (JP); Yuzuru Suzuki, Kanagawa (JP); Kunikazu Ueno, Kanagawa (JP); Koichi Fujii, Kanagawa (JP); Shunsuke Kodaira, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 736 days.

(21) Appl. No.: 11/492,776

(22) Filed: Jul. 26, 2006

(65) Prior Publication Data
US 2007/0139674 A1   Jun. 21, 2007

(30) Foreign Application Priority Data
Dec. 17, 2005   (JP)   ............................. 2005-364144

(51) Int. Cl.
*G03F 3/08* (2006.01)
*G06K 15/00* (2006.01)
*H04N 1/60* (2006.01)

(52) U.S. Cl. .................. 358/518; 358/1.9; 358/2.1; 382/261; 382/266

(58) Field of Classification Search .............. 358/1.9, 358/2.1, 3.06, 3.26, 448, 493, 518, 534; 382/2, 1, 162, 232, 261, 266; 347/131, 252
See application file for complete search history.

(56) References Cited

U.S. PATENT DOCUMENTS

| | | | | |
|---|---|---|---|---|
| 4,668,995 A | * | 5/1987 | Chen et al. ................ 382/272 |
| 5,200,840 A | * | 4/1993 | Koike et al. ............... 358/451 |
| 5,742,410 A | * | 4/1998 | Suzuki ..................... 358/518 |
| 6,025,927 A | * | 2/2000 | Honma ..................... 358/1.18 |
| 6,233,060 B1 | * | 5/2001 | Shu et al. .................. 358/1.9 |
| 6,592,523 B2 | * | 7/2003 | Avinash et al. ............. 600/443 |
| 6,678,072 B1 | * | 1/2004 | Matsuoka et al. .......... 358/2.1 |
| 6,839,151 B1 | | 1/2005 | Andree et al. |
| 7,134,797 B2 | * | 11/2006 | Nishitani ................... 358/1.9 |
| 2002/0061139 A1 | * | 5/2002 | Ohnishi .................... 382/232 |
| 2002/0081023 A1 | * | 6/2002 | Uchida ...................... 382/165 |
| 2003/0007099 A1 | * | 1/2003 | Zhang et al. ............... 348/607 |
| 2003/0072487 A1 | * | 4/2003 | Fan et al. ................... 382/176 |
| 2003/0095287 A1 | * | 5/2003 | Miyagi et al. .............. 358/2.1 |
| 2004/0001148 A1 | | 1/2004 | Takemoto |
| 2004/0105102 A1 | * | 6/2004 | Tomomatsu ............... 358/1.1 |
| 2004/0126019 A1 | * | 7/2004 | Ikebe et al. ................ 382/232 |
| 2004/0141205 A1 | | 7/2004 | Shoda et al. |
| 2005/0031203 A1 | * | 2/2005 | Fukuda ..................... 382/176 |

(Continued)

FOREIGN PATENT DOCUMENTS

EP   0 407 213 A2   1/1991

(Continued)

*Primary Examiner*—Kimberly A Williams
(74) *Attorney, Agent, or Firm*—Oliff & Berridge, PLC

(57) ABSTRACT

An image processing apparatus performs color conversion processing on an input image based on an attribute of the input image, such as if the image is text or a drawing. An image is reduced, and the color conversion is performed. The color converted image is then enlarged. The image is then output by a computer or stored.

28 Claims, 9 Drawing Sheets

U.S. PATENT DOCUMENTS

| | | |
|---|---|---|
| 2005/0036156 A1 | 2/2005 | Hamamura et al. |
| 2005/0088697 A1 | 4/2005 | Yasutomi et al. |
| 2006/0072819 A1* | 4/2006 | Yamamoto et al. .......... 382/173 |
| 2006/0181720 A1* | 8/2006 | Kakutani .................... 358/1.9 |
| 2006/0209323 A1* | 9/2006 | Sawada ...................... 358/1.9 |
| 2007/0139675 A1* | 6/2007 | Kawano et al. .............. 358/1.9 |

FOREIGN PATENT DOCUMENTS

| | | |
|---|---|---|
| EP | 1 377 021 A2 | 1/2004 |
| JP | 11328391 A * | 11/1999 |
| JP | B2-3023374 | 1/2000 |
| JP | A-2005-176036 | 6/2005 |

* cited by examiner

IMAGE PROCESSING APPARATUS AND METHOD THAT PERFORMS DIFFERENTIAL SCALING ON PICTURE REGIONS THAN ON TEXT AND LINE REGIONS TO ENHANCE SPEED WHILE PRESERVING QUALITY

BACKGROUND

1. Technical Field

The invention relates to an image processing technique of performing color conversion processing on an input image.

2. Related Art

Color conversion processing is performed on an image in various situations such as a situation that image processing is performed on a scanned-in image and a resulting processed image is output to a print engine in a copier. Among conventional color conversion methods in copiers, a method, which uses a multi-dimensional look-up table with interpolation, is called "DLUT" (direct look-up table).

FIG. 9 illustrates an exemplary color conversion method using a DLUT. In this example, the three-dimensional L*a*b* color space is divided in such a manner that each of the L*, a*, and b* axes is divided into a prescribed number of sections. The space is divided into cubes or rectangular parallelepipeds and their vertexes are called "lattice points." Color conversion result values are held for the respective vertexes. In the case of a conversion into the CMYK color space, for example, CMYK values are held so as to correspond to the respective lattice points.

For interpolation operation, each divisional cube or rectangular parallelepiped is further divided into six tetrahedrons as shown in FIG. 9. To which tetrahedron input values (L*, a*, b*) belong are judged on the basis of the input values (L*, a*, b*) themselves, and an interpolation operation is performed by using CMYK values corresponding to the four vertexes (lattice points) of the tetrahedron thus found. In this manner, arbitrary input values (L*, a*, b*) can be converted into CMYK values.

SUMMARY

According to an aspect of the invention, an image processing apparatus performs color conversion processing on an input image. The image processing apparatus includes a reducing unit, a first color converting unit and an enlarging unit. The reducing unit reduces the input image. The first color converting unit performs color conversion on the image reduced by the reducing unit. The enlarging unit enlarges the image color-converted by the first color converting unit.

BRIEF DESCRIPTION OF THE DRAWINGS

Exemplary embodiments of the invention will be described in detail based on the following figures, wherein.

DETAILED DESCRIPTION

Figure 1:
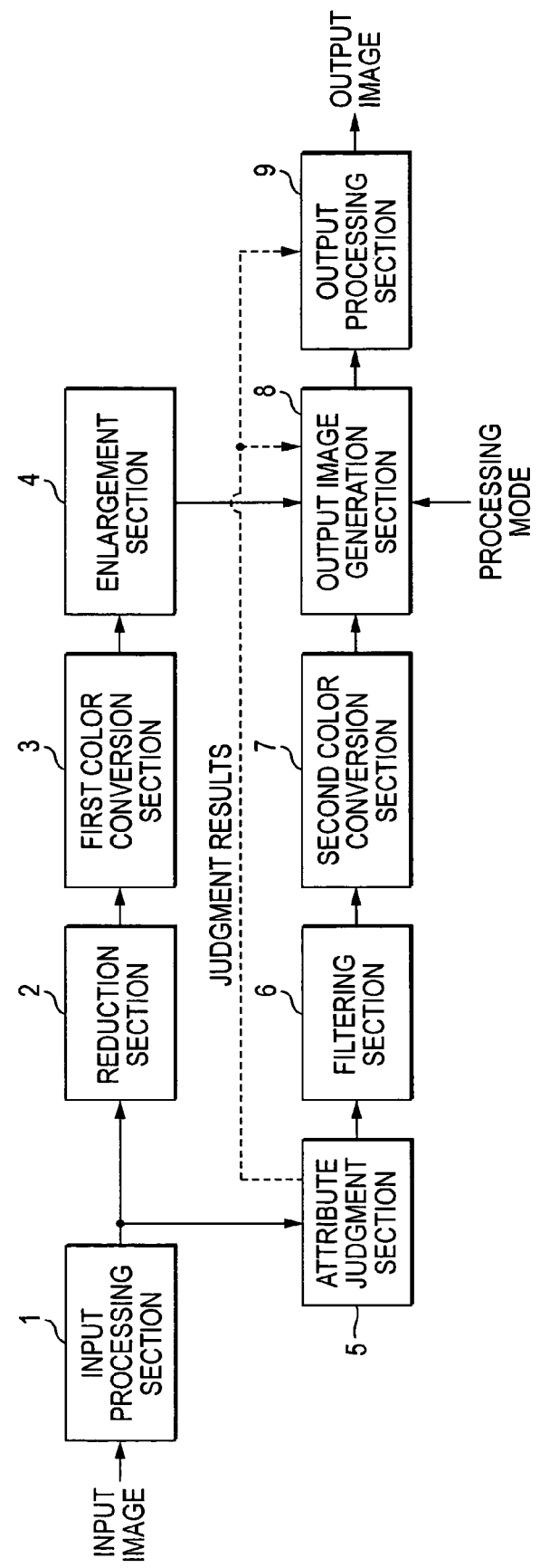
FIG. 1 is a block diagram showing a first exemplary embodiment of the invention.

FIG. 1 is a block diagram showing a first exemplary embodiment of the invention. In FIG. 1, reference numeral 1 denotes an input processing section; 2, a reduction section; 3, a first color conversion section; 4, an enlargement section; 5, an attribute judgment section; 6, a filtering section; 7, a second color conversion section; 8, an output image generation section; and 9, an output processing section. The input processing section 1 performs, on an input image, various kinds of image processing that should be performed before color conversion processing. The color spaces of the input image and an output image are arbitrary.

The reduction section 2 reduces, at a prescribed reduction factor, an image received from the input processing section 1. If an intended output image size is smaller than the size of an image obtained by reducing the original image at the prescribed reduction factor, the image received from the input processing section 1 may be reduced into an image whose size is the same as the output image size.

The first color conversion section 3 performs a color conversion on the reduced image received from the reduction section 2. If the input image color space and the output image color space are different from each other, the first color conversion section 3 also performs a color space conversion. In this exemplary embodiment, the first color conversion section 3 performs a color conversion on images for which importance is attached to the gradation performance rather than the resolution, such as pictorial images (e.g., photographs). The first color conversion section 3 can perform a highly accurate color conversion using a DLUT, for example. Since the image has been reduced by the reduction section 2, the number of pixels of the processing subject is much smaller than that of the original image and hence the amount of processing can be made much smaller than in the case where a color conversion is performed without image reduction.

The enlargement section 4 enlarges a color-converted image received from the first color conversion section 3. Basically, the enlargement section 4 enlarges the color-converted image into an image whose size is the same as before the reduction by the reduction section 2. However, the invention is not limited to such a case. For example, if the output image size is larger than the pre-reduction image size, the enlargement processing may be performed so as to generate an image whose size is the same as the output image size.

The attribute judgment section 5 judges attributes of respective regions of the input image and passes judgment results to the output image generation section 8 and the output processing section 9. The attribute judging method is arbitrary and may be a known method. The attribute judgment section 5 distinguishes between text/line-drawing portions and other portions.

The filtering section 6 extracts edges from the input image and performs adaptive filtering on the input image. This is edge emphasis processing for increasing the image quality of the text/line-drawing portions. Also, the filtering section 6 may be omitted.

The second color conversion section 7 performs a color conversion on a filtered image received from the filtering section 6. If the input image color space and the output image color space are different from each other, the second color conversion section 7 also performs a color space conversion. In this exemplary embodiment, the second color conversion section 7 performs a color conversion on images for which importance is attached to the resolution, such as text images and line-drawing images. Although the second color conversion section 7 may also be configured to use a DLUT or the like, the second color conversion section 7 is not required to perform a highly accurate color conversion because the gradation performance is not very important. Therefore, the second color conversion section 7 can employ a color conversion method that is smaller in the amount of calculation than a color conversion method, which is employed by the first color conversion section 3. The processing speed can be increased by simplifying the processing, for example, decreasing the number of reference data to simplify an interpolation method. Naturally, color conversion methods other than the method using a DLUT, such as a matrix conversion, may be used.

The output image generation section 8 generates an output image from an enlarged image received from the enlargement section 4 and/or a color-converted image received form the second color conversion section 7. Which of the enlarged image received from the enlargement section 4 and the color-converted image received form the second color conversion section 7 should be selected can be determined on the basis of, for example, judgment results of the attribute judgment section 5, preset processing modes, and/or system resources situations. For example, an output image may be generated in the following manner. The color-converted image received form the second color conversion section 7 is selected for regions that have been judged to be text/line-drawing regions by the attribute judgment section 5 and the enlarged image received from the enlargement section 4 is selected for other regions, and an output image is formed by synthesizing the thus-selected portions.

For example, the processing modes may include a document mode and a color mode. An output image may be generated by selecting the color-converted image received form the second color conversion section 7 if the document mode is a text mode and selecting the enlarged image received from the enlargement section 4 if the document mode is a photograph mode. An output image may be generated by selecting the enlarged image received from the enlargement section 4 if the color mode is color and selecting a black-and-white-gradation-converted image received from the second color conversion section 7 or a filtered image produced by the filtering section 6 (no color conversion is performed by the second color conversion section 7) if the color mode is black and white. Furthermore, image switching may be made in accordance with a processing speed mode indicating whether importance is attached to the processing speed or the image quality. The enlarged image received from the enlargement section 4 may be selected in a speed priority mode in which importance is attached to the processing speed, and the color-converted image received form the second color conversion section 7 may be selected in an image quality priority mode in which importance is attached to the image quality. Naturally, where another processing mode exists, image switching may be made in a similar manner, that is, either image may be selected depending on whether importance is attached to the gradation performance or the resolution.

Still further, the above processing modes and judgment results of the attribute judgment section 5 may be used in combination. One example is such that the enlarged image received from the enlargement section 4 is selected throughout the image in the speed priority mode and either image is selected on a region-by-region basis in accordance with the judgment results of the attribute judgment section 5 in the image quality priority mode. Another example is such that either image is selected on a region-by-region basis in accordance with the judgment results of the attribute judgment section 5 if the document mode is a text/photograph mixture mode and either image is selected throughout the image if the document mode is the text mode or the photograph mode. The judgment results of the attribute judgment section 5 may be combined with other processing modes in similar manners. Conversely, where image switching is performed in accordance with only the processing modes, the attribute judgment section 5 may be omitted.

The output processing section 9 performs various kinds of image processing on an image produced by the color conversion processing. This processing may be performed in accordance with the judgment results of the attribute judgment section 5.

Figure 2:
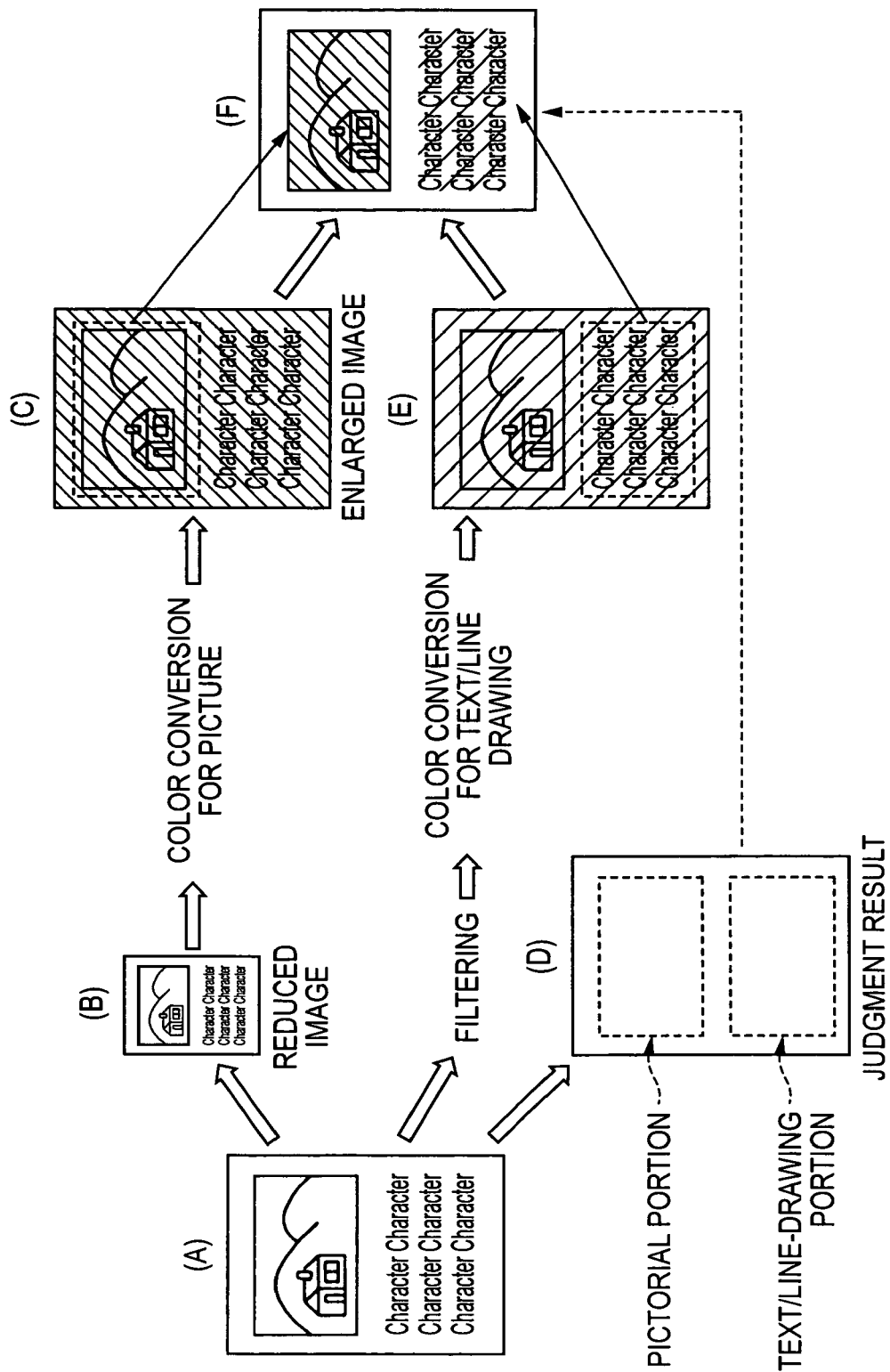
FIG. 2 is an explanatory diagram showing a specific example of the operation of the first exemplary embodiment of the invention.

FIG. 2 is an explanatory diagram showing a specific example of the operation of the first exemplary embodiment of the invention. A description will be made of a case that an image of FIG. 2(A) having a photograph in an upper portion and a text in a lower portion is subjected to both of the processing of the reduction section 2, the first color conversion section 3, and the enlargement section 4 and the processing of the filtering section 6 and the second color conversion section 7.

The image of FIG. 2(A) is processed by the input processing section 1 and then input to the reduction section 2 and the attribute judgment section 5. The reduction section 2 reduces the image of FIG. 2(A) into a reduced image of FIG. 2(B). The first color conversion section 3 performs highly accurate color conversion processing for a picture, on the reduced image. Since the color conversion processing is performed on the reduced image, the color conversion processing can be performed at high speed. Then, the enlargement section 4 enlarges a resulting image so as to restore the original size, whereby a color-converted and enlarged image of FIG. 2(C) is obtained.

On the other hand, the attribute judgment section 5 judges, for each pixel or each set of plural pixels, an attribute of the image processed by the input processing section 1. Assume here that as shown in FIG. 2(D) the attribute judgment section 5 has judged that the upper photograph portion has a picture attribute and the lower text portion has a text/line-drawing attribute.

The filtering section 6 performs the filtering on the image processed by the input processing section 1 to emphasize the edges of the image and then, the second color conversion section 7 performs the color conversion processing for a text/line drawing, on the filtered image. The color conversion processing for a text/line drawing is not required to be highly accurate and hence may be of a type that the amount of processing is small and enables high-speed processing. FIG. 2(E) shows a color-converted image generated by the second color conversion section 7.

The output image generation section 8 generates an output image in accordance with the judgment results of the attribute judgment section 5. Based on the judgment results shown in FIG. 2(D), the output image generation section 8 selects the enlarged image of FIG. 2(C) for the upper portion of the image and selects the color-converted image of FIG. 2(E)

generated by the second color conversion section 7 for the lower portion of the image. As a result, the output image generation section 8 generates an output image of FIG. 2(F). The output image is processed by the output processing section 9 and then output.

As described above, whereas the photograph portion of the output image is lowered in resolution because it has been subjected to the reduction and enlargement, it is color-converted with high accuracy. The text portion is color-converted while the resolution is maintained.

Figure 3:
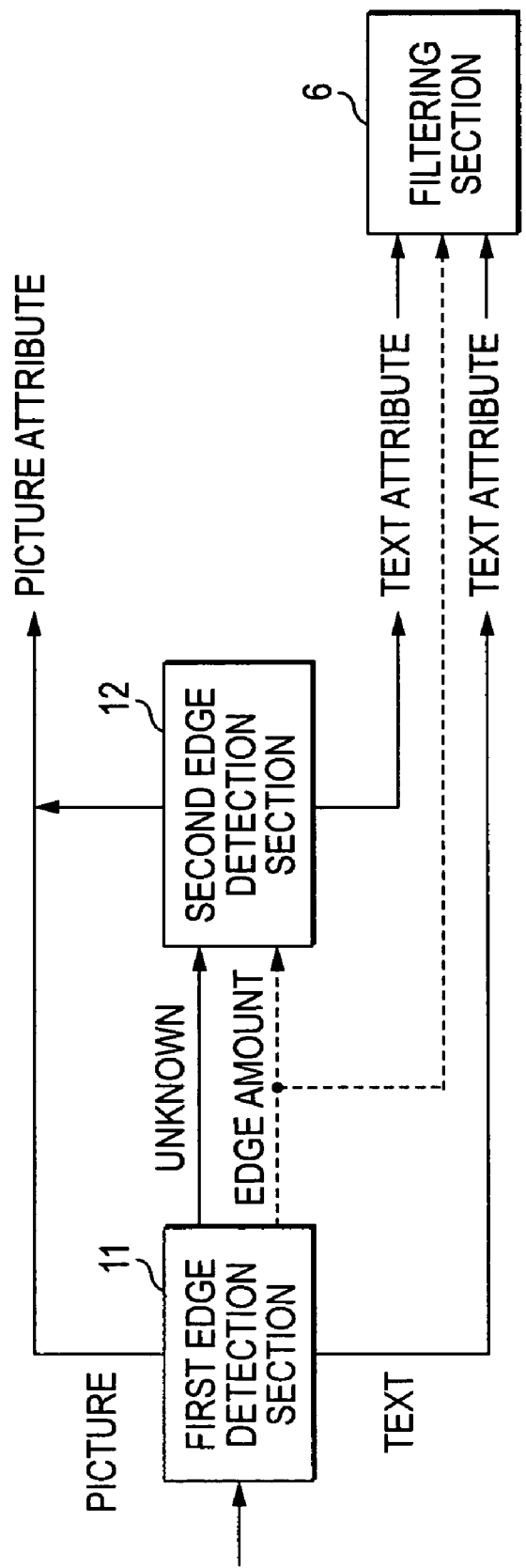
FIG. 3 is a block diagram showing an example of an attribute judgment section.

In the configuration of FIG. 1, further increase in processing speed is possible in the attribute judgment section 5 and the filtering section 6. FIG. 3 is a block diagram showing an example of the attribute judgment section 5. In FIG. 3, reference numeral 11 denotes a first edge detection section and reference numeral 12 denotes a second edge detection section. Whereas various attribute judging methods are available, this example employs a simple attribute judging method that uses the edge amount.

The first edge detection section 11 detects an edge amount by means of a simple edge detection filter, for example. The first edge detection section 11 produces a judgment result "text attribute" if the edge amount is larger than a first threshold value, produces a judgment result "picture attribute" if the edge amount is smaller than a second threshold value, which is smaller than the first threshold value, and produces a judgment result "attribute unknown" in the other case. The first and second threshold values may be varied in accordance with the attribute judgment result of the preceding pixel. For example, only the first threshold value or both of the first and second threshold values are decreased if a judgment result "text attribute" is produced for the preceding pixel. This increases the probability that a judgment result "text attribute" is also produced for the subject pixel. For example, only the second threshold value or both of the first and second threshold values are increased if a judgment result "picture attribute" is produced for the preceding pixel. This increases the probability that a judgment result "picture attribute" is also produced for the subject pixel.

The second edge detection section 12 judges attributes by more detailed processing than the first edge detection section 11, and can judge attributes by one or a combination of various methods. For example, even where the second edge detection section 12 uses an edge detection filter, it may employ a filter having a lager size than the first edge detection section 11. An attribute judgment, which uses an edge amount obtained in this case, may be made by comparing the edge amount with another prescribed threshold value. This threshold value may be weighted by using the edge amount obtained in the first edge detection section 11, more specifically, by the difference between the edge amount and the intermediate value of the first and second threshold values of the first edge detection section 11.

A pixel (or a region consisting of plural pixels) that has been judged to be a text attribute pixel by the first edge detection section 11 or the second edge detection section 12 is subjected to filtering in the filtering section 6. Edge amounts obtained in the first edge detection section 11 of the attribute judgment section 5 may be used in the filtering. For example, a result of a sum-of-products operation on the edge amounts and edge intensities obtained by an edge emphasis filter may be employed as a filtering result.

Also in the filtering section 6, the filtering may be switched in accordance with the judgment results of the attribute judgment section 5, in particular, whether a text attribute has been detected in the first edge detection section 11 or the second edge detection section 12. For example, filtering may be performed by a small-size emphasis filter if a text attribute has been detected in the first edge detection section 11, and by a large-size emphasis filter if a text attribute has been detected in the second edge detection section 12. Naturally, the filtering method may be changed.

The configuration of the attribute judgment section 5 shown in FIG. 3, the modification to the processing of the filtering section 6, and other features can also be applied to the following exemplary embodiments in similar manners.

Figure 4:
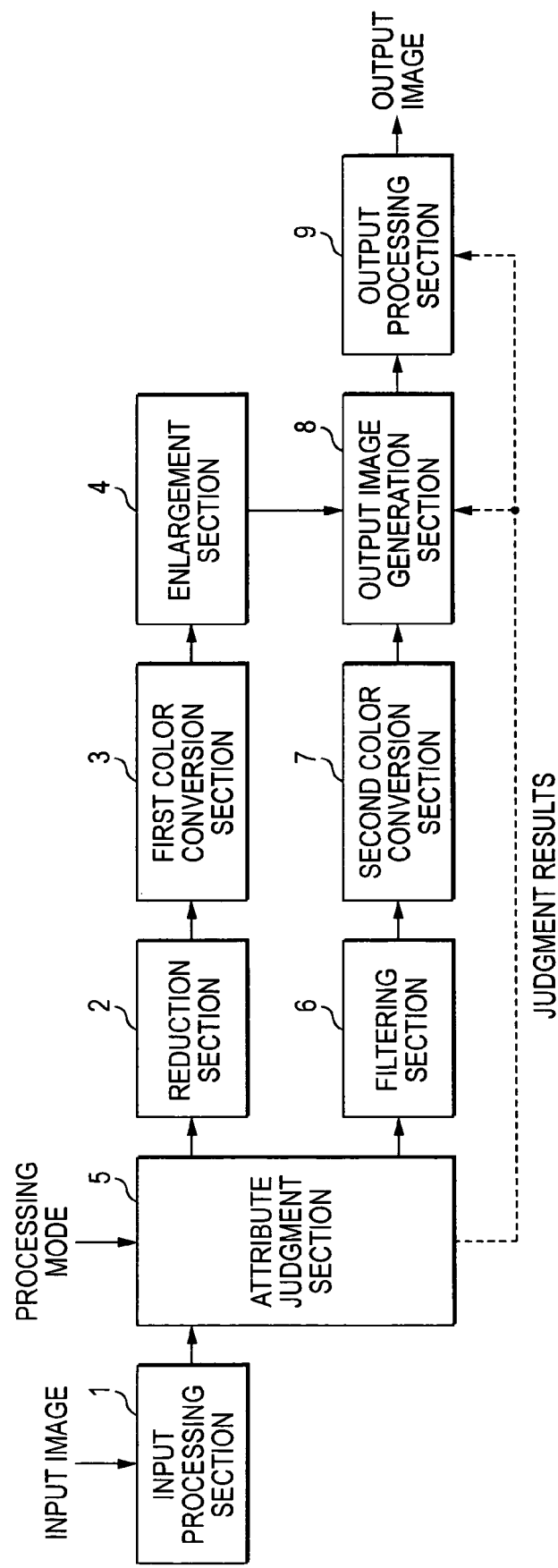
FIG. 4 is a block diagram showing a second exemplary embodiment of the invention.

FIG. 4 is a block diagram showing a second exemplary embodiment of the invention. FIG. 4 employs the same reference numerals as FIG. 1 and redundant descriptions will be omitted. In this exemplary embodiment, the attribute judgment section 5 has a function of assigning portions of an image to the reduction section 2 and the filtering section 6 in accordance with judgment results of the attribute judgment section 5. Portions of an image may be assigned in accordance with processing modes rather than or in combination with image judgment results. The attribute judgment may be performed for each block that includes only one pixel or consists of two or more pixels (in the reduction section 2).

In the exemplary embodiment of FIG. 1, color conversion processing is performed by the first color conversion section 3 and the second color conversion section 7 for regions that will not be selected by the output image generation section 8. In contrast, in the second exemplary embodiment, color conversion processing is performed by only one of the first color conversion section 3 and the second color conversion section 7.

Figure 5:
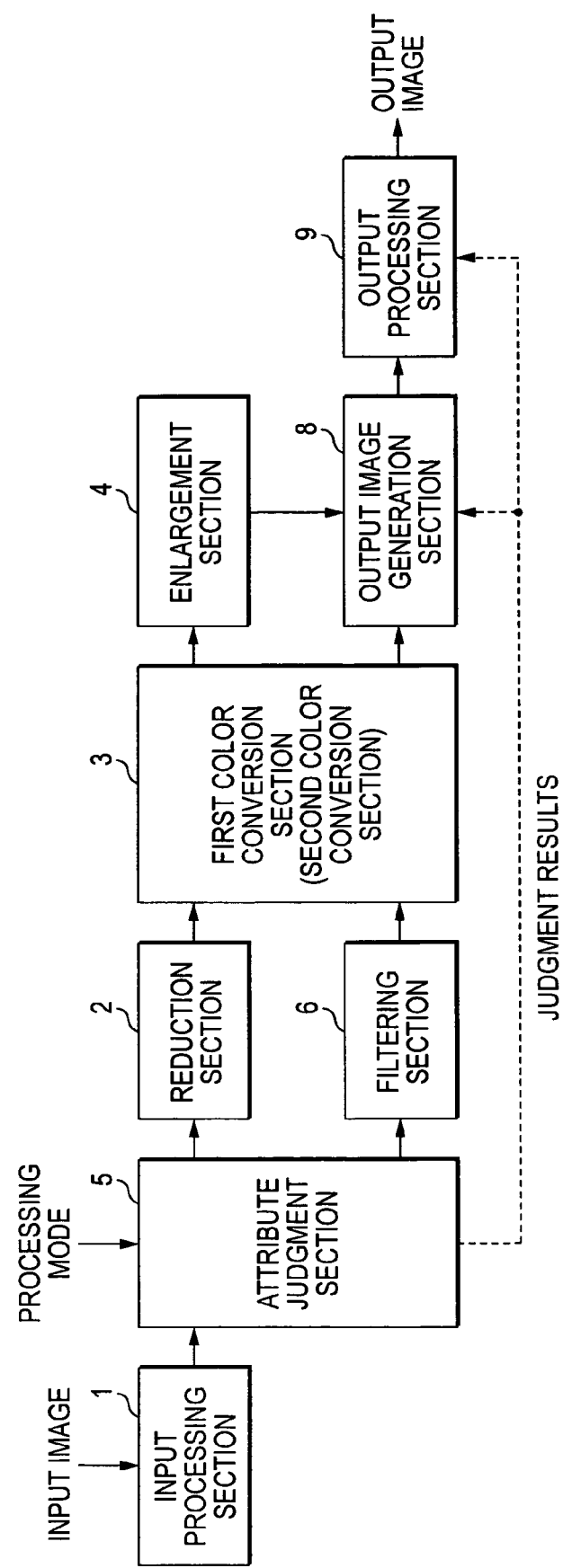
FIG. 5 is a block diagram showing a modification of the second exemplary embodiment of the invention.

FIG. 5 is a block diagram showing a modification of the second exemplary embodiment of the invention. FIG. 5 employs the same reference numerals as FIG. 4. This modification is such that the first color conversion section 3 also serves as the second color conversion section 7. As described above, the total processing speed can be increased by decreasing the number of pixels to be processed by the reduction section 2. Therefore, the processing speed for the entire image can be increased even if a highly accurate color conversion is performed on text/line-drawing portions that are required to be high in resolution.

Figure 6:
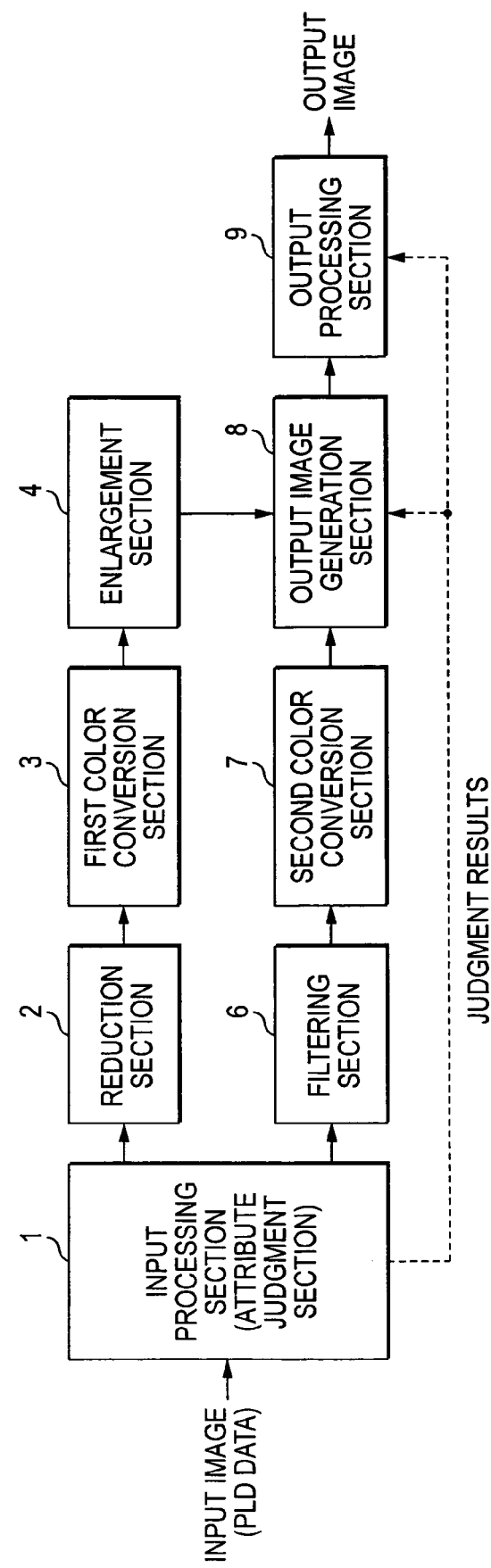
FIG. 6 is a block diagram showing another modification of the second exemplary embodiment of the invention.

FIG. 6 is a block diagram showing another modification of the second exemplary embodiment of the invention. This modification is such that data written in PDL (printer description language) are received as input image data.

The input processing section 1 interprets input image data that are written in PDL and judges attributes of respective drawing objects. Therefore, in this modification, the input processing section 1 also performs the function of the attribute judgment section 5. For example, if a PDL-judged attribute is a text attribute, data in that region are input to the filtering section 6 and then subjected to the color conversion processing of the second color conversion section 7. If a PDL-judged attribute is a picture attribute, data in that region are input to the reduction section 2 and then subjected to the color conversion processing of the first color conversion section 3. If PDL data include a raster image, the raster image may be subjected to area separation processing and then subjected to color conversion processing for a text or a picture.

Figure 7:
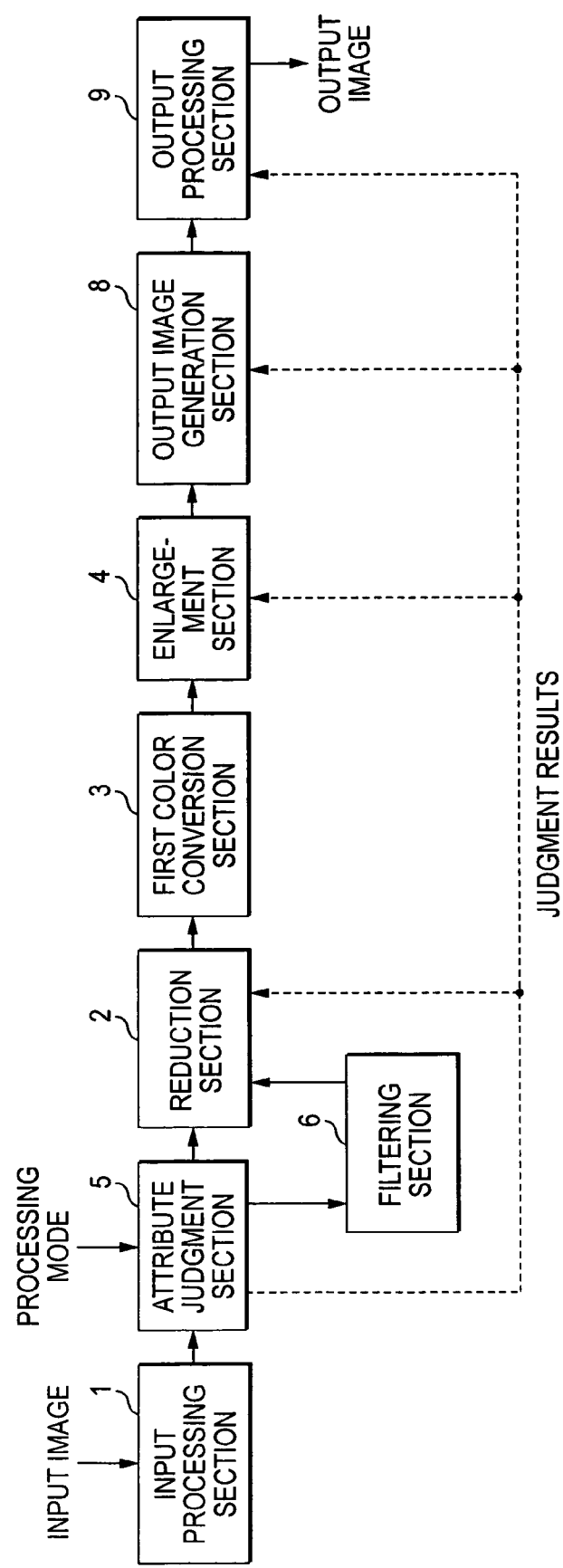
FIG. 7 is a block diagram showing a third exemplary embodiment of the invention.

FIG. 7 is a block diagram is a block diagram showing a third exemplary embodiment of the invention. FIG. 7 employs the same reference numerals as FIG. 1. In this exemplary embodiment, the reduction factor of the reduction section 2 and the enlargement factor of the enlargement section 4 are variable. As the reduction factor of the reduction section 2 is set smaller, the number of pixels to be subjected to the color conversion processing of the first color conversion section 3 decreases and hence the processing speed can be increased. On the other hand, the resolution becomes lower. If the reduction factor is 100%, the same resolution can be obtained as obtained by conventional color conversion processing without reduction.

The attribute judgment section 5 produces control information on the basis of attribute judgment results, a given processing mode, etc. and supplies it to the reduction section 2 and the enlargement section 4. In this exemplary embodiment, the processing of the filtering section 6 is performed for regions that have been judged to be text/line-drawing regions.

The reduction section 2 and the enlargement section 4 set a reduction factor and an enlargement factor, respectively, on the basis of the control information supplied from the attribute judgment section 5. The reduction section 2 performs reduction processing on the image also supplied from the attribute judgment section 5. The first color conversion section 3 performs color conversion processing on a reduced image or, if the reduction factor is 100%, the non-reduced image. The enlargement section 4 performs enlargement processing on a color-converted image (performs no processing if the enlargement factor is 100%) and outputs a resulting image.

Although in this exemplary embodiment the reduction factor of the reduction section 2 and the enlargement factor of the enlargement section 4 are controlled, it is also possible to switch, for example, the reduction method of the reduction section 2 and the enlargement method of the enlargement section 4. For example, where a relatively high resolution is required, the apparent resolution may be increased by employing an enlargement method suitable to attain a high resolution in the enlargement section 4 after color conversion processing has been performed on a reduced image.

Figure 8:
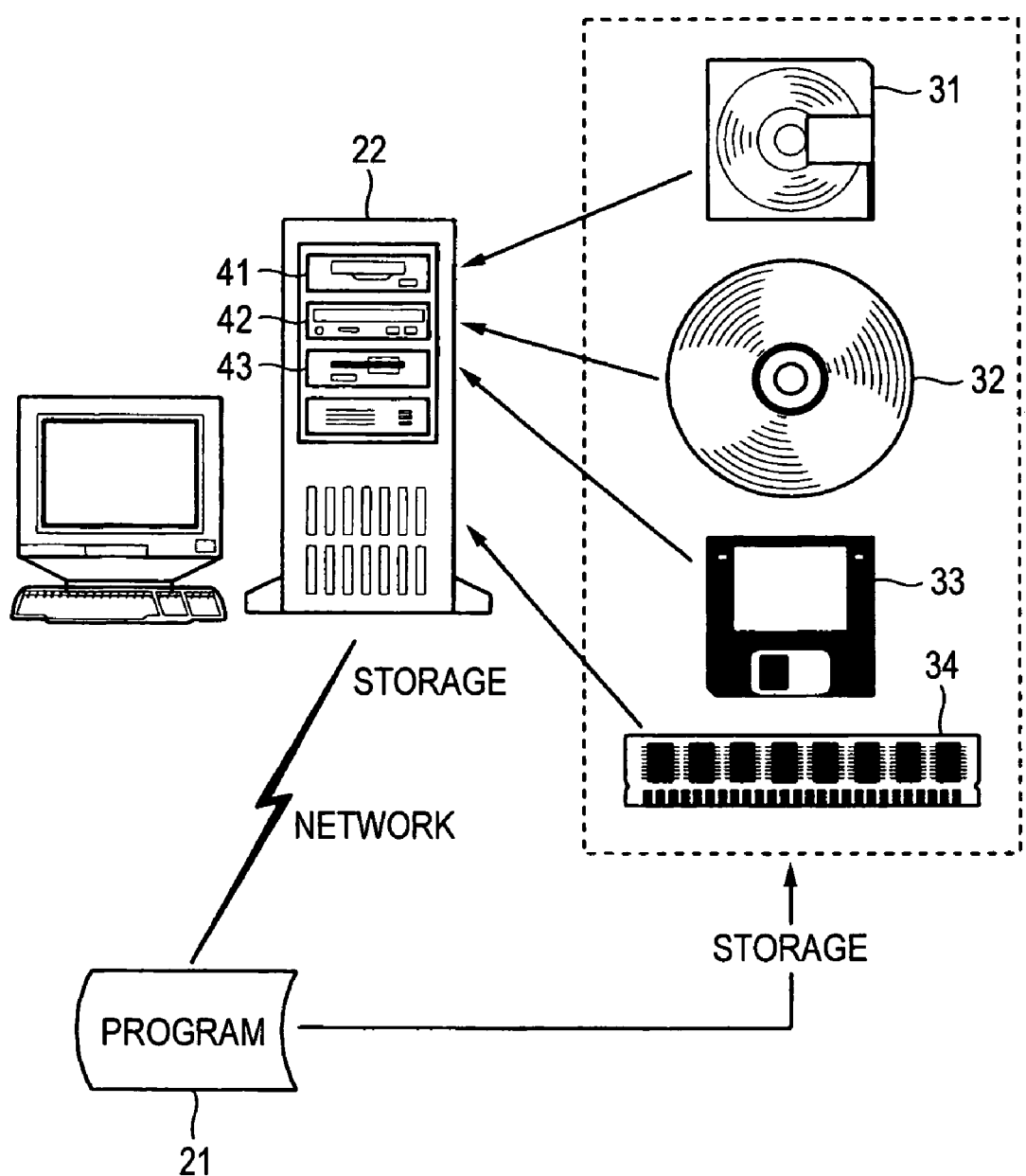
FIG. 8 is an explanatory diagram showing a computer program as an implementation of the functions of the image processing apparatus according to the exemplary embodiments of the invention or the image processing method according to the exemplary embodiments of the invention as well as exemplary storage media in which the computer program is stored.
Figure 9:
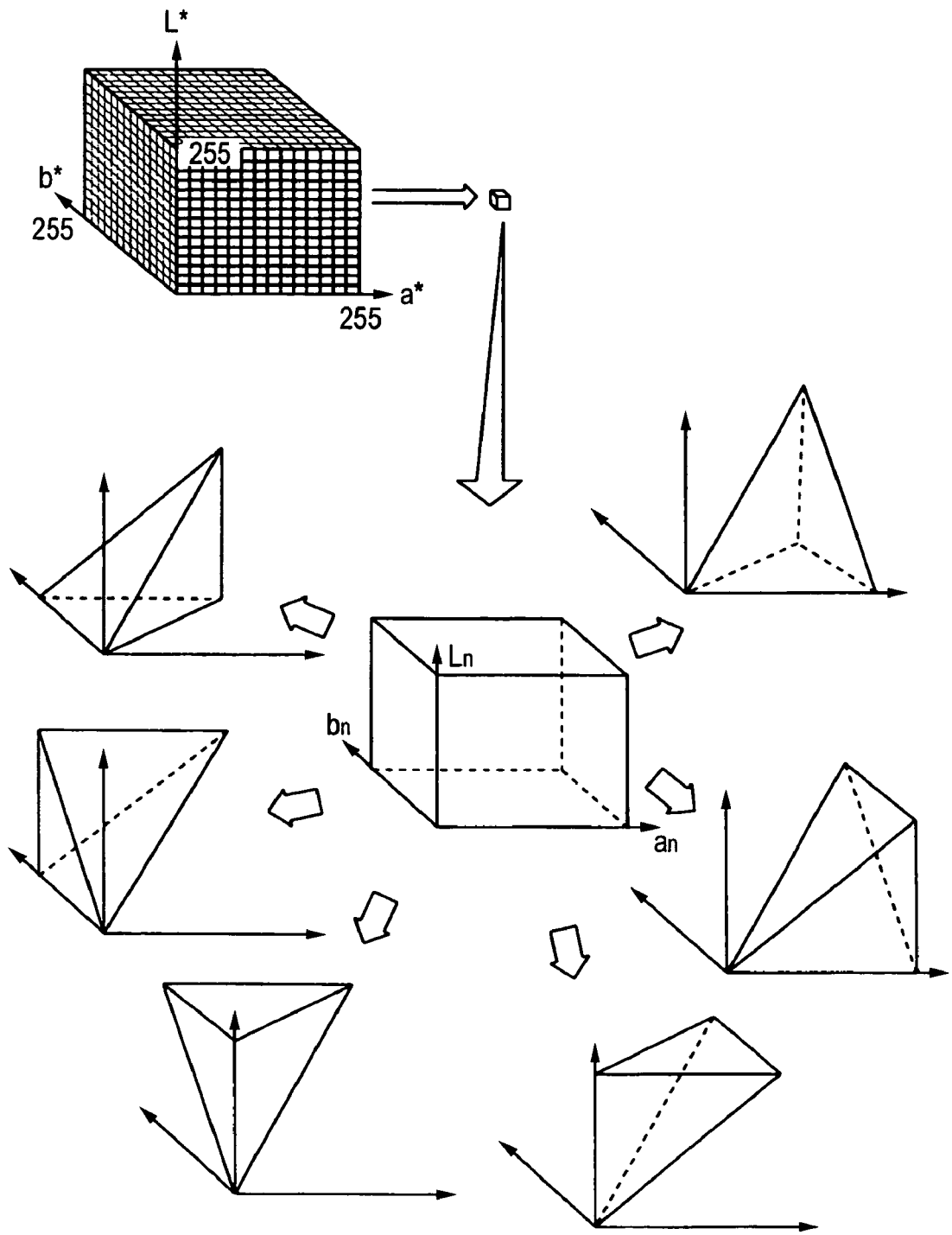
FIG. 9 illustrates an exemplary color conversion method using a DLUT.

FIG. 8 is an explanatory diagram of a computer program as an implementation of the functions of the image processing apparatus according to the invention or the image processing method according to the invention as well as exemplary storage media in which the computer program is stored. In FIG. 8, reference numeral 21 denotes a program; 22, a computer; 31, a magneto-optical disc; 32, an optical disc; 33, a magnetic disk; 34, a memory; 41, a magneto-optical disc drive; 42, an optical disc drive; and 43, a magnetic disk drive.

All or part of the configuration of each of the above-described embodiments and modifications can be realized by the program 21 which can be run by a computer. Where it is realized by the program 21, the program 21, data used by the program 21, and other information can be stored in a computer-readable storage medium. The term "storage medium" means a medium which makes it possible to transmit the description contents of a program to a reading device as a hardware resource of a computer in the form of a signal corresponding to variation states of magnetic, optical, electrical, or like energy that are caused according to the description contents of the program. Examples of the storage medium are the magneto-optical disc 31, the optical disc 32 (including a CD and a DVD), the magnetic disk 33, and the memory 34 (including an IC card and a memory card). Naturally, the storage medium is not limited to portable ones.

The functions of image processing apparatus according to the invention can be performed or processing can be performed according to the image processing method according to the invention by storing the program 21 in one of those storage media in advance, mounting the storage medium in the magneto-optical disc drive 41, the optical disc drive 42, the magnetic disk drive 43, a memory slot (not shown), or an interface (not shown) of the computer 22, for example, and causing the computer 22 to read out the program 21. The functions of image processing apparatus can be performed or processing can be performed according to the image processing method by mounting or incorporating a storage medium in the computer 22 in advance, transferring the program 21 to the computer 22 over a network, for example, and storing the program 21 in the storage medium, and causing the computer 22 to run the program 21. Naturally, all or part of the functions may be implemented by hardware.

What is claimed is:

1. An image processing apparatus for performing color conversion processing on an input image, the image processing apparatus comprising a computer that:
   judges an attribute of each region of the input image;
   reduces the input image to form a reduced image;
   performs a first color conversion on the reduced image to form a first color-converted image;
   enlarges the first color-converted image to form a first enlarged image;
   performs a second color conversion on the input image to form a second color-converted image; and
   generates an output image based on at least one of the first enlarged image and the second color-converted image, wherein:
   the second color conversion is performed according to a color conversion method, which requires less calculation than a color conversion method of the first color conversion;
   the output image is generated by selecting for each region either the first enlarged image in the enlarging step or the second color-converted image in accordance with the judged attribute of the corresponding region; and
   the attribute judging detects an edge amount in the input image and judges the attribute of each region using the detected edge amount.

2. The apparatus according to claim 1, wherein the computer:
   performs adaptive filtering on the input image, the adaptive filtering emphasizes an edge contained in the input image.

3. The apparatus according to claim 2, wherein the computer:
   judges an attribute of each region of the input image, wherein:
   the output image is generated by selecting for each region either the enlarged image or the second color-converted image in accordance with the attribute of the corresponding region judged in the attribute judging, to generate the output image,
   the attribute judging includes:
   a first judging that judges the attribute of each region; and
   a second judging that judges an attribute of one region if the first judging cannot judge the attribute of the one region,
   judgment processing performed by the first judging is simpler than that performed by the second judging,
   the adaptive filtering includes a first filtering if the first judging of the attribute judging judges that the attribute of the one region is one, which requires the second color conversion,
   the adaptive filtering performs second filtering if the second judging judges that the attribute of the one region is one, which requires the second color conversion, and
   the second filtering involves a larger processing amount than the first filtering.

4. The apparatus according to claim 2, wherein:
   either the first enlarged image or the second color-converted image is selected in accordance with a color mode, to generate the output image, and one of the first enlarged image and the second color-converted image is selected and filtered by the adaptive filtering and not subjected to the second color conversion if the color mode is a black-and-white mode.

5. The apparatus according to claim 1, wherein:
the attribute judging includes:
a first judging of the attribute of each region; and
a second judging of one region if the first judging cannot judge the attribute of the one region, wherein
judgment processing performed in the first judging is simpler than that performed in the second judging.

6. The apparatus according to claim 5, wherein:
the first judging judges the attribute of each region using a first edge detection filter,
the second judging judges the attribute of the one region using a second edge detection filter, and
a size of the second detection filter is larger than that of the first detection filter.

7. The apparatus according to claim 1, wherein:
the input image is data written in printer description language, and
the attribute judging interprets the data written in the printer description language to judge the attribute of each region.

8. The apparatus according to claim 1, wherein:
the output image generating selects the color-converted image for a region, which the attribute judging judges as a text/line-drawing region, and
the output image generating selects the first enlarged image for a region, which the attribute judging judges as a photograph region.

9. The apparatus according to claim 1, wherein either the first enlarged image or the second color-converted image is selected in accordance with a processing mode, to generate the output image.

10. The apparatus according to claim 1, wherein either the first enlarged image or the second color-converted image is selected in accordance with a document mode, to generate the output image.

11. The apparatus according to claim 1, wherein either the first enlarged image or the second color-converted image is selected in accordance with a color mode, to generate the output image.

12. The apparatus according to claim 1, wherein either the first enlarged image or the second color-converted image is selected in accordance with a processing speed mode indicating whether priority is attached to the processing speed or the image quality, to generate the output image.

13. The apparatus according to claim 1, wherein either the first enlarged image or the second color-converted image is selected in accordance with system resource situations of the apparatus, to generate the output image.

14. The apparatus according to claim 1, wherein:
a reducing algorithm or a reduction factor of reducing the input image is changed in accordance with a processing mode, and
an enlarging algorithm or a enlargement factor of enlarging the first color-converted image is changed in accordance with the processing mode.

15. An image processing method executed on a computer for performing color conversion processing on an input image, the method comprising:
reducing the input image, with a processor, to form a reduced image;
performing a first color conversion on the reduced image to form a first color-converted image;
enlarging the first color-converted image to form a first enlarged image;
performing a second color conversion on the input image to form a second color-converted image;
generating an output image based on at least one of the first enlarged image and the second color-converted image;
judging an attribute of each region of the input image; and
detecting an edge amount in the input image, wherein:
the second color conversion requires less calculation than the first color conversion;
the generating of the output image includes selecting for each region either the first enlarged image or the second color-converted image in accordance with the judged attribute of the corresponding region; and
the attribute of each region is judged using the detected edge amount.

16. The method according to claim 15, further comprising:
performing adaptive filtering on the input image that emphasizes an edge contained in the input image, wherein:
the second color conversion is performed on the image subjected to the adaptive filtering.

17. The method according to claim 16, further comprising:
judging an attribute of each region of the input image, wherein:
the generating of the output image includes selecting for each region either the first enlarged image or the second color-converted image in accordance with the judged attribute of the corresponding region,
the judging of the attribute of each region includes:
performing a first judgment processing on each region of the input image to judge the attribute of each region; and
performing a second judgment processing on one region to judge an attribute of the one region if the first judgment processing cannot judge the attribute of the one region, and
the first judgment processing is simpler than the second judgment processing,
the adaptive filtering includes:
performing first filtering if a result of the first judgment processing indicates that the attribute of the one region is one, which requires the second color conversion,
performing second filtering if a result of the second judgment processing indicates that the attribute of the one region is one, which requires the second color conversion, and
the second filtering involves a larger processing amount than the first filtering.

18. The method according to claim 16, wherein:
the generating of the output image includes selecting either the first enlarged image or the second color-converted image in accordance with a color mode, and
the selecting selects the image, which is subjected to the adaptive filtering and not the second color converted image if the color mode is a black-and-white mode.

19. The method according to claim 15, wherein:
the judging of the attribute of each region includes:
performing a first judgment processing on each region of the input image to judge the attribute of each region; and
performing a second judgment processing on one region to judge an attribute of the one region if the first judgment processing cannot judge the attribute of the one region, and
the first judgment processing is simpler than the second judgment processing.

20. The method according to claim 19, wherein:
the first judgment processing uses a first edge detection filter,
the second judgment processing uses a second edge detection filter, and
a size of the second edge detection filter is larger than that of the first edge detection filter.

21. The method according to claim 15, wherein:
the input image is data written in printer description language, and
the judging of the attribute of each region comprises interpreting the data written in the printer description language to judge the attribute of each region.

22. The method according to claim 15, wherein:
the selecting of either the first enlarged image or the second color-converted image includes:
selecting the second color-converted image for a region, which a result of the judging indicates as a text/line-drawing region, and
selecting the first enlarged image for a region, which the result of the judging indicates as a photograph region.

23. The method according to claim 15, wherein the selecting of either the first enlarged image or the second color-converted image includes selecting either the first enlarged image or the second color-converted image in accordance with a processing mode.

24. The method according to claim 15, wherein the selecting of either the first enlarged image or the second color-converted image includes selecting either the first enlarged image or the second color-converted image in accordance with a document mode.

25. The method according to claim 15, wherein the selecting of either the first enlarged image or the second color-converted image includes selecting either the first enlarged image or the second color-converted image in accordance with a color mode.

26. The method according to claim 15, wherein the generating of the output image including selecting either the first enlarged image or the second color-converted image in accordance with a processing speed mode of an apparatus which performs the color conversion processing, wherein the processing speed mode indicates whether priority is attached to the processing speed or the image quality.

27. The method according to claim 15, wherein the generating of the output image includes selecting either the first enlarged image or the second color-converted image in accordance with a system resource situations of an apparatus, which performs the conversion processing.

28. The method according to claim 15 wherein:
the reducing changes a reducing algorithm or a reduction factor in accordance with a processing mode, and
the enlarging changes an enlarging algorithm or a enlargement factor in accordance with the processing mode.

* * * * *